(12) United States Patent
Cannon et al.

(10) Patent No.: US 7,231,207 B1
(45) Date of Patent: Jun. 12, 2007

(54) INTELLIGENT INCOMING CALL MANAGEMENT DURING CORDLESS INTERCOM MODE

(75) Inventors: Joseph M. Cannon, Harleysville, PA (US); James A. Johanson, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/511,701

(22) Filed: Feb. 23, 2000

Related U.S. Application Data

(60) Provisional application No. 60/172,842, filed on Dec. 20, 1999.

(51) Int. Cl.
 *H04M 3/42* (2006.01)
(52) U.S. Cl. .................. 455/416; 455/415; 455/417; 379/211.02; 379/211.01; 370/260; 370/261
(58) Field of Classification Search ................ 455/462, 455/464, 403, 416, 415, 417; 370/352, 260, 370/261; 379/211.01, 211.02
See application file for complete search history.

(56) References Cited

U.S. PATENT DOCUMENTS

| | | | |
|---|---|---|---|
| 4,640,987 A * | 2/1987 | Tsukada et al. | 379/62 |
| 4,650,931 A * | 3/1987 | Tsukada et al. | 379/61 |
| 5,297,203 A | 3/1994 | Rose et al. | |
| 5,371,783 A * | 12/1994 | Rose et al. | 379/61 |
| 5,550,900 A * | 8/1996 | Ensor et al. | 379/67 |
| 5,703,934 A * | 12/1997 | Zicker et al. | 379/61 |
| 5,752,195 A | 5/1998 | Tsuji et al. | |
| 6,006,088 A * | 12/1999 | Couse | 455/415 |
| 2004/0228336 A1* | 11/2004 | Kung et al. | 370/352 |

FOREIGN PATENT DOCUMENTS

| | | | |
|---|---|---|---|
| JP | 64-058153 | * | 6/1989 |
| WO | WO 99/31865 | | 6/1999 |

* cited by examiner

*Primary Examiner*—Danh Le

(57) ABSTRACT

In one embodiment according to the invention, a cordless telephone comprises a base unit and a handset. An RF link between the base unit and the handset is adapted for use during a telephone conversation and for use as an intercom. When in an intercom mode, an incoming call is handled in a manner that does not automatically terminate the intercom mode in response to the incoming call. For example, call related information associated with the incoming call may be analyzed, and a decision to terminate the intercom mode may be based on the call related information. In an alternative example, call related information may be transmitted by the base unit to the handset, and the handset may be adapted to display at least a portion of the call related information, so that a user may elect whether to respond to the incoming call or to maintain the intercom. In another alternative embodiment according to the invention, a method of handling an incoming call in a cordless telephone that is in an intercom mode, includes the steps of analyzing call related information associated with the incoming call, and deciding whether to terminate the intercom mode based on the call related information.

11 Claims, 3 Drawing Sheets

INTELLIGENT INCOMING CALL MANAGEMENT DURING CORDLESS INTERCOM MODE

CROSS-REFERENCE TO RELATED APPLICATION

This application claims priority of Provisional Application Ser. No. 60/172,842, which was filed on Dec. 20, 1999, and is incorporated herein by reference in its entirety.

FIELD OF THE INVENTION

The invention is directed to the field of telephony, and in particular to cordless telephones that include an intercom between the base unit and the handset.

BACKGROUND OF THE INVENTION

Cordless telephones include a base unit, which is typically in a relatively "fixed" location, and a handset, which may be cradled in the base unit, such as when charging a battery, or which may roam relative to the base unit, such as when engaged in a telephone call. The base unit is typically coupled to a network, such as the Public Switched Telephone Network (PSTN), via a physical connection. The base unit is also coupled, via an RF connection, to the handset. Thus, when a user is engaged in a telephone call, the user interacts with a microphone and a speaker in the handset, associated RF signals are transmitted between the handset and the base unit, and the base unit interfaces with the network.

Some conventional cordless telephones take advantage of the RF link between the base unit and the handset by enabling an intercom mode. In this mode, for example, a user who is at a location remote from the base unit may use the intercom mode to communicate with another user located near the base unit. The particular methods of establishing the intercom vary amongst the conventional cordless telephones.

For example, some conventional telephones allow the user with the handset to initiate an intercom mode connection by activating a key on a keypad of the handset, thereby causing a signal to be transmitted over the RF link to the base unit. This signal may automatically initiate the intercom mode. Alternatively, the intercom mode may begin when the other user at the base unit responds to an alert, such as an audible signal, by activating a key on the base unit. Alternative cordless telephone configurations enable a user to initiate an intercom mode from the base unit, such as during a paging operation. Of course, some cordless telephones enable the intercom mode to be initiated from either the base unit or the handset.

Regardless of the initiation method, one consistent prerequisite to the intercom mode is that the cordless telephone must be in an on-hook condition (i.e., there is not an on-going telephone call) prior to the initiation of the intercom mode. This requirement is mandated by the fact that there is only one RF link between the base unit and the handset, and that if the link is employed in an on-going telephone conversation, then it cannot be employed for intercom purposes.

Another conventional feature mandated by the existence of a single link is that an on-going intercom conversation cannot be maintained in the presence of a new incoming call. Conventionally, therefore, when a new call is incoming, the cordless telephone terminates the intercom mode prior to causing a ringing signal to be produced by the base unit and/or the handset. This can be inconvenient in that it may abruptly terminate an on-going discussion of import. This inconvenience may be especially pronounced if the incoming call is of little or no import, such as a telemarketing solicitation. There is therefore a need for a more intelligent way of handling an incoming call in a cordless telephone engaged in an intercom mode.

SUMMARY OF THE INVENTION

This need is met, in one embodiment according to the invention, by a cordless telephone comprising a base unit and a handset, wherein an RF link between the base unit and the handset is adapted for use during a telephone conversation and for use as an intercom, and wherein, when in an intercom mode, an incoming call is handled in a manner that does not automatically terminate the intercom mode in response to the incoming call. For example, call related information associated with the incoming call may be analyzed, and a decision to terminate the intercom mode may be based on the call related information.

In an alternative example, call related information may be transmitted by the base unit to the handset, and the handset may be adapted to display at least a portion of the call related information, so that a user may elect whether to respond to the incoming call or to maintain the intercom.

In another alternative embodiment according to the invention, a method of handling an incoming call in a cordless telephone that is in an intercom mode includes the steps of analyzing call related information associated with the incoming call, and deciding whether to terminate the intercom mode based on the call related information.

BRIEF DESCRIPTION OF THE DRAWINGS

Objects and advantages of the invention will be apparent to one of skill in the art upon review of the following detailed description in light of the drawing, wherein.

DETAILED DESCRIPTION

Figure 1:
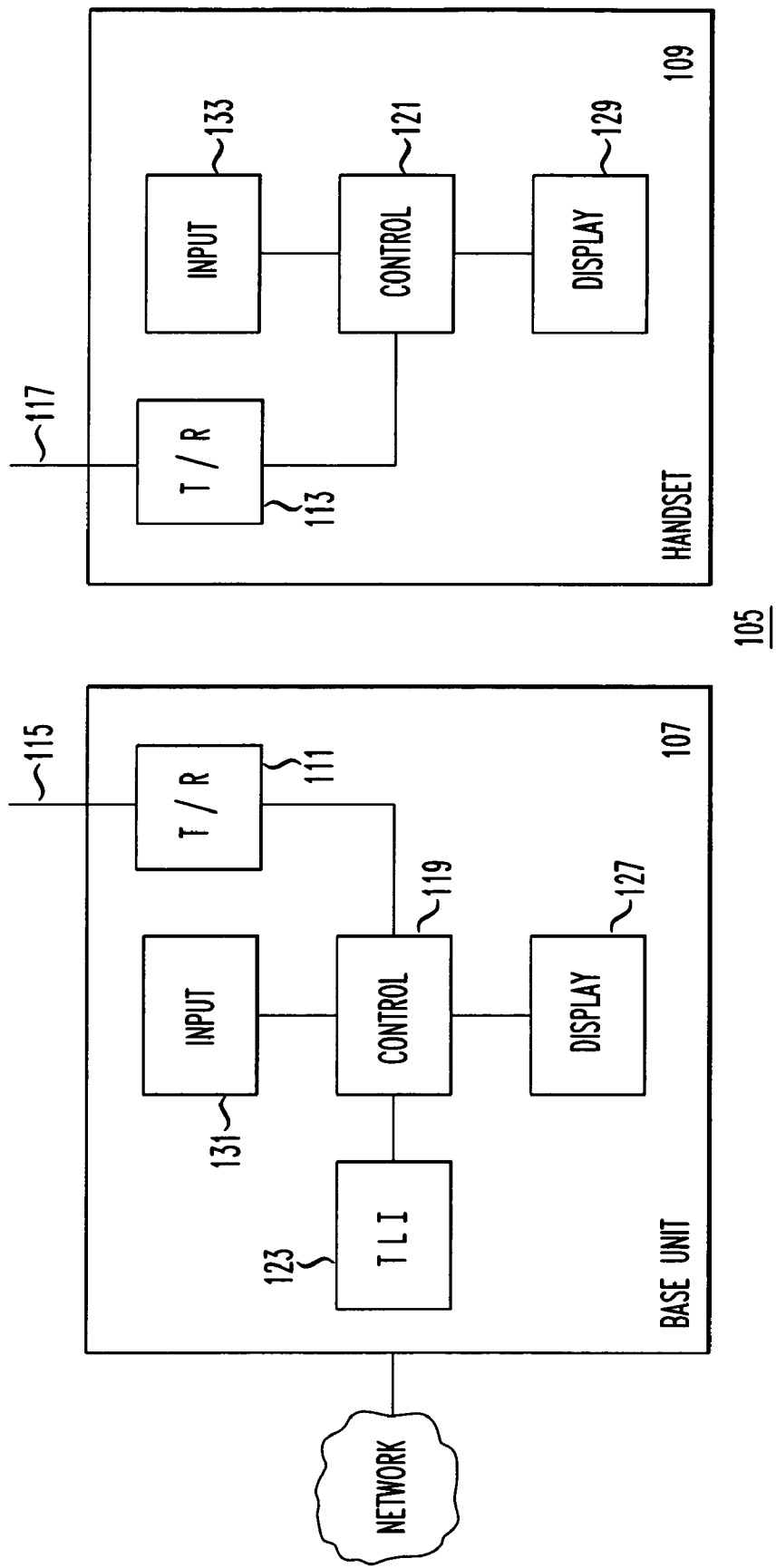
FIG. 1 is a simplified block diagram of one embodiment of a cordless telephone according to the invention.

FIG. 1 is a simplified block diagram of a cordless telephone adapted to operate according to the invention. Telephone 105 comprises two primary components: a base unit 107 and a handset 109. A link, such as an RF link, is established between the base unit 105 and handset 107 by way of a transceiver 111 in base unit 107 and a transceiver 113 in handset 109. The transceivers 111 and 113 are respectively coupled to antennas 115 and 117, and are respectively controlled by controllers 119 and 121.

Controllers 119 and 121 may be integrated circuit based devices, such as microcontrollers or digital signal processors (DSPs). For example, the controllers may be in the DSP 16XX family available from Lucent Technologies, Inc. Controllers 119 and 121 are programmed to control the operations of the base unit 107 and handset 109 according to the invention. For example, controllers 119 and 121 may be programmed to allow for an intercom mode wherein an RF link exists between the base unit 107 and the handset 109. When in the intercom mode, two users communicate between the base unit 107 and handset 109 by speaking into microphones (not shown) and listening to speakers (not shown) integrated therein.

When a user speaks into a microphone in one of the base unit 107 and handset 109, the microphone converts the sounds incident thereon into electrical signals. These electrical signals may be conditioned and/or converted, such as by conversion into digital form via an analog-to-digital converter portion of a codec, and then transmitted over the RF link to the other of the base unit 107 and handset 109. At the receiving end, the signals are recovered and output from the speaker.

Conventionally, such an intercom conversation is immediately terminated upon the receipt of an incoming call. For example, base unit 107 may include a telephone line interface (TLI) 123 that links the base unit 107 to a network 125, such as a public switched telephone network (PSTN) and in a conventional cordless telephone, an incoming call from the PSTN will terminate the intercom conversation. However, according to the invention, the intercom conversation is not immediately terminated upon the receipt of the incoming call. In one exemplary embodiment, the intercom conversation is maintained, and data associated with the incoming call is provided to at least one of the parties to the intercom conversation. A party to the intercom conversation may elect, based on the data, to cause the intercom conversation to be terminated in favor of the incoming call. Alternatively, the party may elect to maintain the intercom conversation and ignore the incoming call. According to this option, the ignored incoming caller may be forwarded to a voicemail system, such as a central office based voicemail system.

This exemplary embodiment thus treats the incoming caller in the same way as an incoming caller is treated in a Type II Caller ID scenario, also known as Caller ID with Call Waiting (CID/CW). In CID/CW, while a first party is engaged in a telephone conversation with a second party, and a third party incoming caller is attempting to reach the first party, the first party is alerted to the incoming call by a series of "tones", also known as Subscriber Alert Signals (part of conventional Call Waiting), and is provided with Caller ID data associated with the incoming caller, such as on a display in the first party's handset. If the first party desires to speak with the incoming caller (third party), the first party can temporarily place the second party on hold by activating a "switchhook" device. Further, the first party can toggle back and forth between the second and third parties by repetitively activating the switchhook.

According to the invention, therefore, the base unit 107 and handset 109 are configured, primarily by way of particular programming of controllers 119 and 121, to emulate a CID/CW situation when the baseline situation is that there is no telephone call between a first party's telephone and a second party's telephone, but where instead there is an intercom conversation between the base unit 107 and the handset 109.

Figure 2:
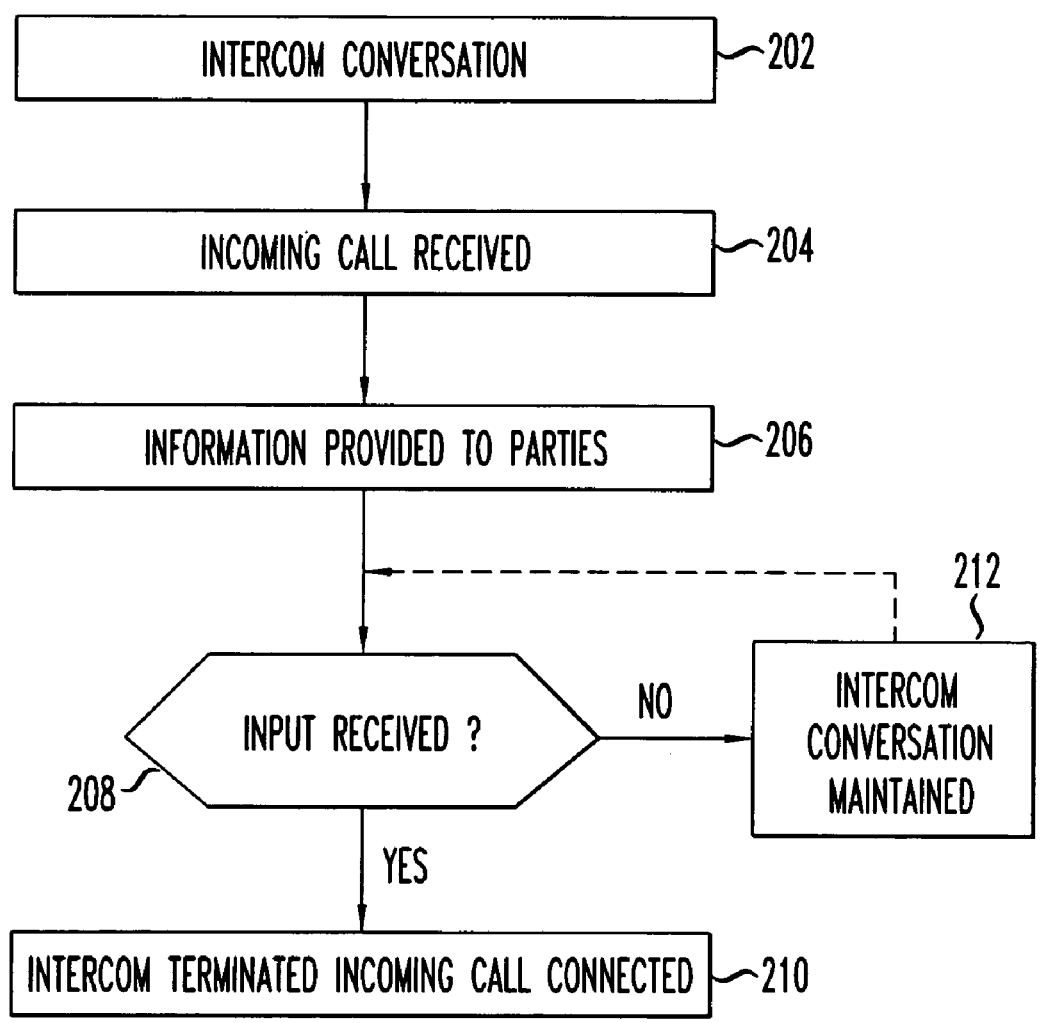
FIG. 2 is a simplified operational flowchart of one embodiment according to the invention.

FIG. 2 provides an operational flowchart according to the invention. At step 202, an intercom conversation is on-going. At step 204, an incoming call is received. For example, a signal is received in base unit 107 from the network 125. This signal is received by TLI 123 and information contained in the signal is processed by controller 119. At step 206, call related information associated with the incoming call, such as Caller ID data, is made available to at least one of the parties to the intercom conversation. For example, the controller 119 may cause the information to be displayed at the location of the base unit, such as on a display element 127. Alternatively, or additionally, the controller 119 may cause a signal to be transmitted over the RF link from the base unit 107 to the handset 109 informing the controller 121 of the information, which may thus be displayed on display 129.

At step 208, a determination is made as to whether user input is received, such as via a user input unit 131 of base unit 107 or user input unit 133 of handset 109, to cause the termination of the intercom conversation in favor of receipt of the incoming call. If so, at step 210 the intercom conversation is terminated and the incoming call is connected. If, on the other hand, the determination at step 208 is that there is no such input, then the intercom conversation is maintained at step 212. The process may continue at step 208 by looking for user input until the incoming call is terminated by the incoming caller, until the intercom conversation is terminated, and/or until a certain period of time expires.

As part of an exemplary implementation of step 206, for the embodiment wherein the information is transmitted between the base unit and the handset, the RF link may be attenuated to facilitate the transfer of the information and/or to make the information transfer less perceptible by the parties. For example, transducers associated with the handset 109 and/or the base unit 107 may be muted or attenuated in a way that reduces or eliminates any cross effects between the audio signals of the intercom conversation and the data transfer. In one example, a microphone and speaker of the handset 109 are muted prior to the transmission of the call related information. This may be accomplished, for example, in response to a signal that alerts the handset of the upcoming data transfer. The alerting signal may be an audible signal that also alerts the party at the handset to the incoming call and/or to the presence of call related information. The handset 109 may also provide an acknowledge signal to the base unit 107 to inform the base unit 107 that the handset 109 is prepared to receive the call related information.

As part of an exemplary implementation of step 208, the input may be received from a user associated with the handset 109, and information associated with this input may be transmitted, such as via the RF link, from the handset 109 to the base unit 107. The base unit 107 may thus operate, based on the input, to maintain the intercom conversation or to connect the incoming call via the TLI 123 and the network 125.

In an alternative embodiment, the call related information may be analyzed automatically by one or more of the processors 119, 121. For example, processor 119 may be adapted to evaluate the call related information, such as Caller ID data, and make a determination as to whether to accept the incoming call based on the analysis. For example, a table may be stored in a memory associated with controller 119 or incorporated into controller 119, and the table may include a list of the call related information that, if associated with an incoming call, should result in termination of the intercom conversation and acceptance of the incoming call. Alternatively, the table may include data associated with calls that should not be accepted in place of the intercom conversation.

Figure 3:
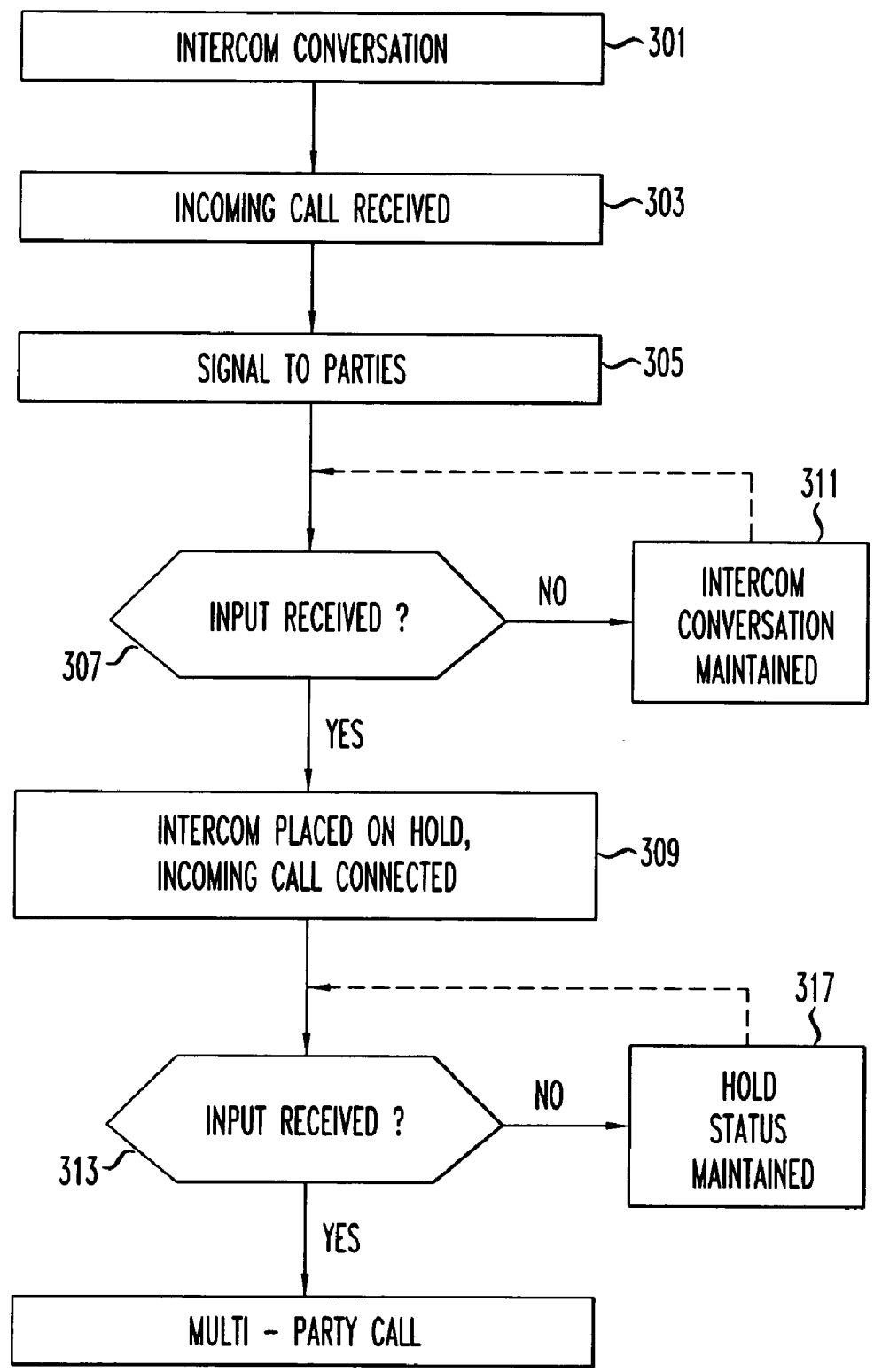
FIG. 3 is a simplified operational flowchart of another embodiment according to the invention

In another alternative embodiment according to the invention, an incoming call may be answered and the intercom conversation may be maintained in a way that emulates conventional call waiting functionality. This is shown, for example, in FIG. 3, where an intercom conversation is on-going at step 301, and an incoming call is received at step 303. Instead of immediately terminating the intercom conversation in response to the incoming call, as would be conventional, according to this embodiment, some form of signal, such as, for example, a signal comparable to the SAS signal, is provided to at least one of the parties to the intercom conversation at step 305.

At step 307, a determination is made as to whether an input, such as an activation of a particular button on a keypad or activation of a switchhook is received from a user. If so, then the intercom conversation is placed on hold and the incoming call is connected, at step 309. If, on the other hand, there is no input, then the intercom conversation is maintained and the incoming call is ignored, at least until the input is provided, at step 311.

If the incoming call is connected at step 309, then the process advances to step 313, where additional input, such as the additional activation of a key or switchhook, is evaluated. If such an input is received, then the party to the intercom conversation is added in to the call, such that a multi-party conversation occurs, at step 315. If, on the other hand, such input is not received, then the intercom conversation may remain in the hold status, at least until the input is received, or until the incoming call is terminated, at step 317.

The signal provided to the parties at step 305 may be as simple as a SAS tone, as discussed above, or may include Caller ID data or other call related data, such as contained within the embodiment of the invention described with respect to FIG. 2. Further, the signaling, muting, and other alternative features of that embodiment may be incorporate in to the embodiment of FIG. 3, for example, as part of the signaling step 305.

Based on an understanding of these various embodiments, one of skill in the art is likely to conceive of alternative embodiments that are not specifically enumerated here, but that are clearly within the scope of the invention.

The invention claimed is:

1. A cordless telephone, comprising:
   a base unit; and
   a handset;
   wherein an RF link between the base unit and the handset is adapted for use during a telephone conversation and for use as an intercom; and
   wherein, when in an intercom mode, call related information analyzed automatically by a processor is presented to at least one of said base unit and said handset to allow selective connection of an incoming call simultaneously at least one of said base unit and said handset, said intercom mode being maintained between said base unit and said handset while said incoming call is added as a third party to said intercom mode.

2. A cordless telephone as recited in claim 1, wherein the call related information comprises Caller ID data.

3. A cordless telephone as recited in claim 1, wherein the selective connection is performed by a processor in at least one of said base unit and said handset.

4. A cordless telephone as recited in claim 1, wherein the call related information is transmitted by the base unit to the handset.

5. A cordless telephone as recited in claim 4, wherein a signal is transmitted from the base unit to the handset prior to the transmission of the call related information.

6. A cordless telephone as recited in claim 5, wherein an acknowledge signal is transmitted from the handset to the base unit prior to the transmission of the call related information.

7. A cordless telephone as recited in claim 4, wherein the handset is adapted to display at least a portion of the call related information.

8. A cordless telephone as recited in claim 7, wherein the handset is adapted to receive user input and to provide a signal related to the user input to the base unit.

9. A cordless telephone as recited in claim 8, wherein the base unit is adapted to affect the intercom mode based on the signal related to the user input.

10. A cordless telephone, comprising:
    a base unit; and
    a handset;
    wherein an RF link between the base unit and the handset is adapted for use during a telephone conversation and for use as an intercom; and
    wherein, when in an intercom mode, call related information is presented to at least one of said base unit and said handset to allow selective connection of an incoming call simultaneously at least one of said base unit and said handset while maintaining said intercom mode between said base unit and said handset; and
    wherein audio is attenuated prior to the transmission of the call related information.

11. A method of handling an incoming call in a cordless telephone, comprising:
    establishing an intercom mode between a base unit and a handset of a cordless telephone; and
    selectively maintaining said intercom mode between said base unit and said handset based on incoming call related information analyzed automatically by a processor while an incoming call is added as a third party to said intercom mode with two-way communication with both said base unit and said handset.

* * * * *